A. ESSLEY.
ANTISKIDDING, NON-SLIPPING TIRE PROTECTOR.
APPLICATION FILED APR. 16, 1914.
1,127,978.
Patented Feb. 9, 1915.
2 SHEETS—SHEET 1.
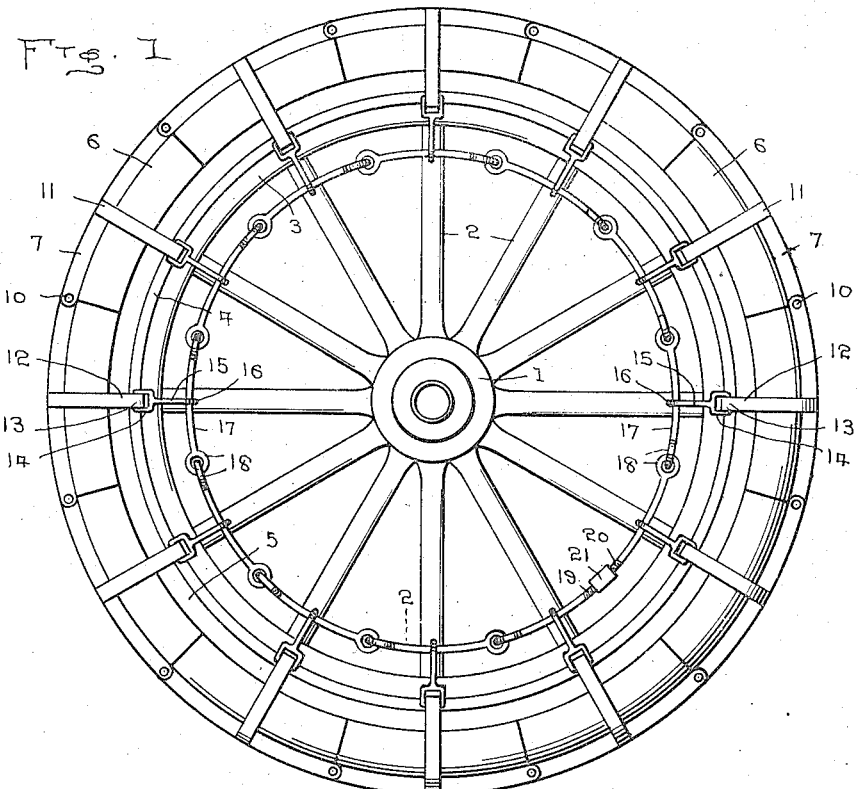
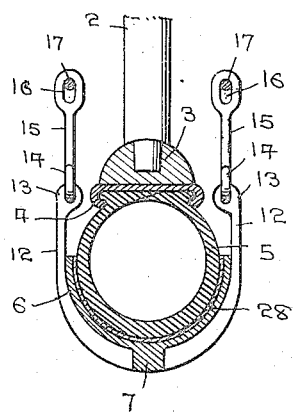
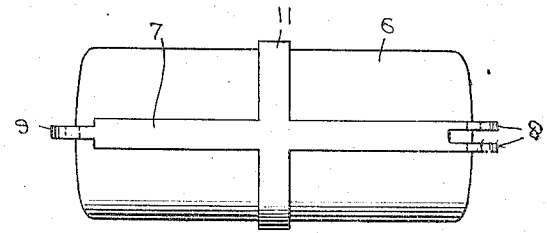

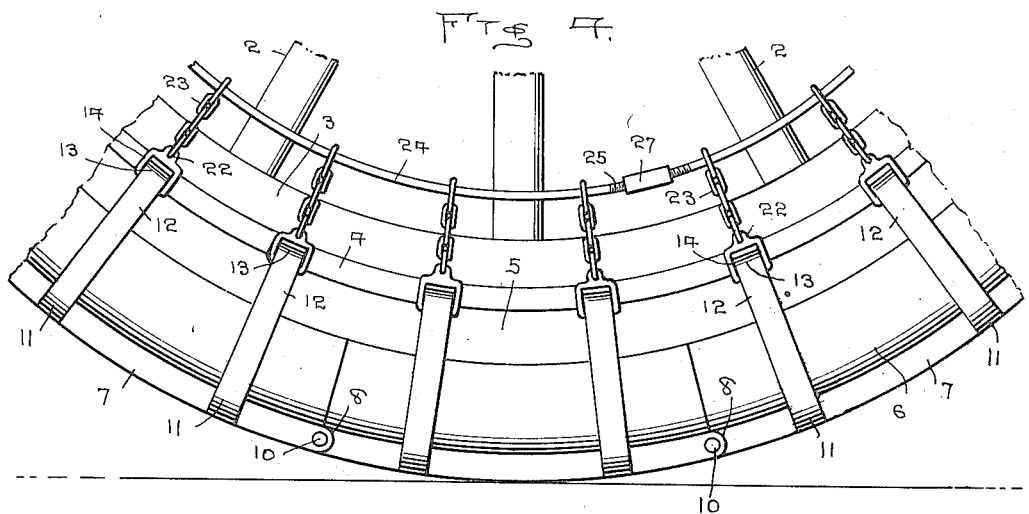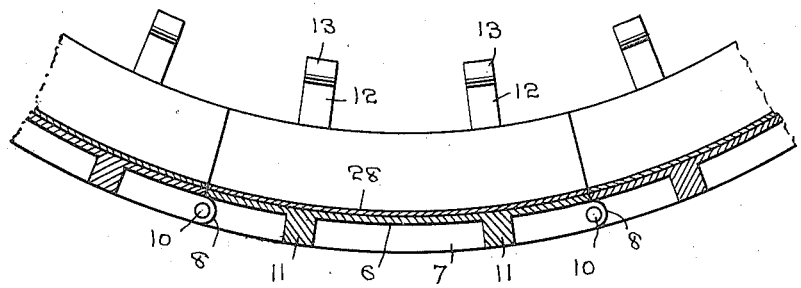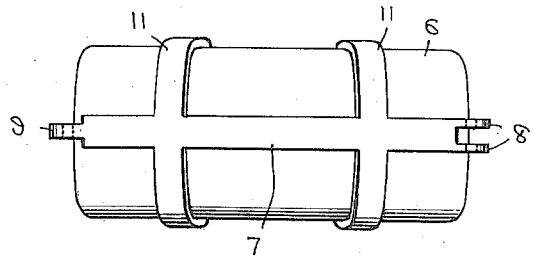

UNITED STATES PATENT OFFICE.

ASBURY ESSLEY, OF EUSTIS, NEBRASKA.

ANTISKIDDING, NON-SLIPPING TIRE-PROTECTOR.

1,127,978.    Specification of Letters Patent.    Patented Feb. 9, 1915.

Application filed April 16, 1914. Serial No. 832,281.

*To all whom it may concern:*

Be it known that I, ASBURY ESSLEY, a citizen of the United States, residing at Eustis, in the county of Frontier and State of Nebraska, have invented certain new and useful Improvements in Antiskidding, Non-Slipping Tire-Protectors; and I do hereby declare the following to be a full, clear, and exact description of the invention, such as will enable others skilled in the art to which it appertains to make and use the same.

This invention relates to an anti-skidding, non-slipping tire protector for pneumatic tires, and has for one of its objects the construction of a tire protector which may be readily attached to or detached from an automobile or other wheel.

A further object of this invention resides in the provision of a tire protector which not only prevents the wheels of the vehicle from skidding, but also prevents the wheels from slipping when traveling over either muddy, icy or other slippery surfaces.

A still further object of this invention resides in the provision of a tire protector which reduces the possibility of puncture to a minimum thus obviating the danger of explosion of the tire. And a still further object of this invention resides in the provision of a pneumatic tire protector which will prevent unnecessary wear of the tire and at the same time prevents the marring or scratching of the paint or other polished surface of the wheel construction by positioning the securing means of the protector out of contact with the spokes and the rims of the wheel.

Another object of this invention resides in the construction of a protector for pneumatic tires consisting of few parts, simple in structure, efficient and durable in purpose and which can be manufactured and sold upon the market at a nominal cost.

These and other objects will more fully appear and the nature of the invention more clearly understood by the construction, combination and arrangement of the parts thereof as described in the following specification, defined in the appended claims and illustrated in the accompanying drawings, in which, Figure 1 is an elevational view of a wheel having a pneumatic tire showing the manner of mounting the protector thereon. Fig. 2 is a vertical transverse sectional view on line 2—2 of Fig. 1. Fig. 3 is a bottom plan view of one of the sections constituting the tire protector showing the longitudinal and transverse ribs thereon and the means at each end thereof for connecting the respective sections together. Fig. 4 is an elevational view of the lower portion of the wheel, partly broken away, showing a slightly modified form of securing the sections of the tire protector upon the wheel. Fig. 5 is a vertical longitudinal sectional view through several of the sections of the protector showing the manner of arranging the protector lining within the several sections. Fig. 6 is a bottom plan view of one of the sections of the protector similar to that shown in Fig. 3, excepting this section is provided with two transverse anti-slipping ribs.

Referring to the drawings, 1 denotes the hub of the wheel, 2 the spokes thereof, 3 the felly, 4 the rim and 5 the pneumatic tire mounted within the rim.

The protector consists of a plurality of sections 6 slightly concaved in a longitudinal direction in accordance with the contour of the periphery of the wheel, the sections 6 being also concaved transversely approximately semicircular, the curvatures and interior contour of the respective sections 6, it is to be understood, are to be formed of the same contour of the tire to which the protectors are to be applied. Each of the sections 6 is provided along its longitudinal central outer surface portions with the anti-skidding rib 7 integral therewith, and formed at one end of the rib 7 are the apertured ears 8 and at the opposite end of each of the ribs 7 are the apertured tongues 9, the tongues 9 interfitting within the adjacent ears 8 of the continuous plate section and retained in its relative interfitting position through the medium of the bolts 10 and thus hingedly connecting the respective sections of the protector together. The vertical end walls of each of the sections are formed slightly convergent relative to each other in order that the same may fit flush with each contiguous section for the purpose of preventing any portion of the tread surface of the tire 5 from being exposed thus eliminating all dangers from puncture. Each of the sections 6 are further provided with the transverse anti-slipping ribs 11 centrally arranged upon the outer surface of each of the sections and formed integrally therewith as shown in Fig. 3, or the sections 6 may be provided with two transverse anti-slipping ribs as shown in Fig. 4, or any other number may be supplied as may be deemed expedient. Each of the transverse anti-slipping ribs 11 encircle the plate 6 and project upwardly at each side of the tire 5 terminating in the arms 12 provided with the loop 13 at the end thereof into which is fitted the yoke 14 of the link 15, the free end of the link 15 being apertured as at 16 and through which passes the securing chain comprising a plurality of links 17 suitably linked together as shown at 18, with the exception that certain of the meeting ends of the links 17 are provided with left hand screw threads 19 and the right hand screw threads 20 respectively, the threaded ends 19 and 20 of the respective links 17 being secured together by the screw threaded tightening union 21.

In lieu of the links 15 and the chain links 17 as shown in Figs. 1 and 2, the yokes 14 may be provided with the ears 22 into which are secured the chains 23 through the end links of which passes the securing rod 24 circular in form, the meeting ends of the rod 24 being provided with the left hand screw threads 25 and the right hand screw threads 26, the respective screw threaded ends of the rod being secured together by the internal and reverse threaded tightening union 27, the intention being to supply by this arrangement, a means for tightening the combination of parts into a rigid casing surrounding the pneumatic tire.

While I have here shown only one tightening union in Figs. 1 and 4, it is to be understood that any number may be used in the securing chain 17 or the securing rod 24 as may be desired, and that the sections 6 may be provided with any number of longitudinal anti-skidding ribs, as well as any number of transverse anti-slipping ribs deemed advisable to meet the exigencies of the case.

The protector may be composed of any number of sections 6 and of various lengths and dimensions necessary for efficiently encompassing a pneumatic tire for protecting the same against puncture or other damage, the meeting edges of the sections being so formed as to provide a secure and tight joint between the same throughout their width in a manner for preventing the exposure of any portion of the tread surface of the tire, and for preventing wear between the inner surface of the protector and the surface of the tire, I provide an inner protector lining or shield within each of the sections 6, the protector lining being composed of rubberized canvas or other suitable material. The lining 28 may also be of one continuous strip and not in individual strips one for each section as above described.

It is also to be noted that I have provided a protector for the tires of automobile wheels which efficiently preserve the surface thereof from unnecessary wear and from the exposure to puncture, the protector being provided with anti-skidding ribs for preventing the lateral sliding of the vehicle and is further provided with transversely arranged anti-slipping ribs for preventing the wheels from slipping when the same are traveling up a hill wherein the surface is slippery due to mud or ice.

Another feature of this invention resides in the fact that the securing means for the protector is wholly out of contact with the spokes, rim or other portions of the wheel and this prevents the scratching or marring of the paint or other polished surface upon the wheel.

The protector is capable of ready attachment and detachment either to or from the tire in a most expeditious manner as it is only necessary in either case to loosen one of the tightening unions, unfasten one of the bolts 10 for connecting the sections together and the protector may be readily removed from the wheel, or the reverse operation is resorted to for readily attaching the protector to the wheel.

While I have here shown and described the preferred embodiment of my invention I hereby reserve the right to make such alterations and variations therein from time to time as I may deem expedient and which will not depart from the spirit of this invention nor conflict with the scope of the claims.

Having thus fully described my invention what I claim as new and desire to secure by Letters Patent of the United States is:—

1. In combination with a wheel and the tire thereof, of a practically continuous protector for said tire comprising a plurality of concave sections having ends closely abutting throughout their entire width; a longitudinal central rib formed integrally upon each of said sections the several ribs being joined together by interfitting extensions of the ends thereof; transverse ribs adjacent the ends of the said sections and integral therewith, terminating in upwardly projecting arms, a securing chain on each side of said wheel; means for connecting said arms to said chain and a plurality of tightening unions disposed throughout the said chain, whereby the parts comprising the protector may be drawn tightly together forming a rigid shell encircling the pneumatic tire.

2. In combination with a wheel and the tire thereof of a protector comprising a plurality of concave sections having closely fitting ends throughout their entire width; a longitudinal rib formed integrally on the surface of each of said sections, the ribs being joined by integral hinge extensions upon the ends thereof, transverse ribs adjacent the ends of said sections, and integral therewith terminating in upwardly projecting arms provided with loops at the ends thereof; links engaging said loops and connecting with securing chains positioned on each side of said wheel and a plurality of tightening unions properly spaced throughout the length of the securing chains, whereby the parts composing the protector may be drawn into a rigid casing encircling and embracing the pneumatic tire.

In testimony whereof I have signed my name to this specification in the presence of two subscribing witnesses.

ASBURY ESSLEY.

Witnesses:
J. M. KNOX,
L. P. SORNSON.